(12) United States Patent
Salter et al.

(10) Patent No.: US 10,549,683 B1
(45) Date of Patent: Feb. 4, 2020

(54) VEHICLE EXTERIOR ILLUMINATION

(71) Applicant: FORD GLOBAL TECHNOLOGIES, LLC, Dearborn, MI (US)

(72) Inventors: Stuart C. Salter, White Lake, MI (US); Paul Kenneth Dellock, Northville, MI (US); Annette Lynn Huebner, White Lake, MI (US); Ross Dykstra Pursifull, Dearborn, MI (US); David Brian Glickman, Southfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/196,520

(22) Filed: Nov. 20, 2018

(51) Int. Cl.
| | |
|---|---|
| B60Q 1/50 | (2006.01) |
| F21S 43/16 | (2018.01) |
| F21S 43/20 | (2018.01) |
| B60J 5/04 | (2006.01) |
| B60J 1/00 | (2006.01) |
| B60J 1/08 | (2006.01) |

(52) U.S. Cl.
CPC ............. B60Q 1/503 (2013.01); F21S 43/16 (2018.01); F21S 43/26 (2018.01); B60J 1/001 (2013.01); B60J 1/08 (2013.01); B60J 5/04 (2013.01)

(58) Field of Classification Search
CPC . B60Q 1/503; F21S 43/16; F21S 43/26; F21S 43/00; F21S 45/00; B60J 1/001; B60J 1/08; B60J 5/04; F21V 9/06; F21V 9/30; F21V 9/32; F21V 9/38; F21V 1/17; F21V 3/08; F21V 3/12; F21V 5/10; F21V 7/26; F21V 7/30; F21V 9/02; F21V 9/08; F21V 9/35; F21V 9/40; F21V 9/45; F21V 13/08; F21V 13/14; F21W 2102/00; F21W 2102/20; F21W 2103/00; F21W 2103/10; F21W 2103/15; F21W 2103/20; F21W 2103/30; F21W 2104/00
See application file for complete search history.

(56) References Cited

U.S. PATENT DOCUMENTS

| | | | |
|---|---|---|---|
| 6,808,806 | B2 | 10/2004 | Phillips et al. |
| 8,564,502 | B2 | 10/2013 | Cui et al. |
| 9,855,888 | B1 * | 1/2018 | Dellock ............... B60Q 3/20 |
| 10,053,006 | B1 | 8/2018 | Salter et al. |
| 2008/0236007 | A1 | 10/2008 | Au et al. |
| 2015/0294363 | A1 | 10/2015 | Bhola et al. |
| 2017/0210282 | A1 | 7/2017 | Rodriguez |
| 2018/0264999 | A1 * | 9/2018 | Salter ............... B60Q 3/217 |

FOREIGN PATENT DOCUMENTS

| | | |
|---|---|---|
| IN | 04193MU2015 A | 11/2017 |
| WO | 2017071911 A1 | 5/2017 |

OTHER PUBLICATIONS https://www.carmudi.com.ph/journal/new-smart-glass-turns-car-windows-into-mobile-ad-displays/.

* cited by examiner

*Primary Examiner* — Bao Q Truong
(74) *Attorney, Agent, or Firm* — Vichit Chea; MacMillan, Sobanski & Todd, LLC

(57) ABSTRACT

A vehicle may include a window including an outer layer, perovskite adjacent to and inboard from the outer layer, and a UV blocking layer inboard from the perovskite; and a UV laser mounted on a vehicle exterior and directed toward the window. The vehicle may also include an exterior body panel having an outer layer of clearcoat, an adjacent layer of perovskite inboard from the clearcoat and a layer of basecoat inboard from and adjacent to the perovskite.

19 Claims, 2 Drawing Sheets

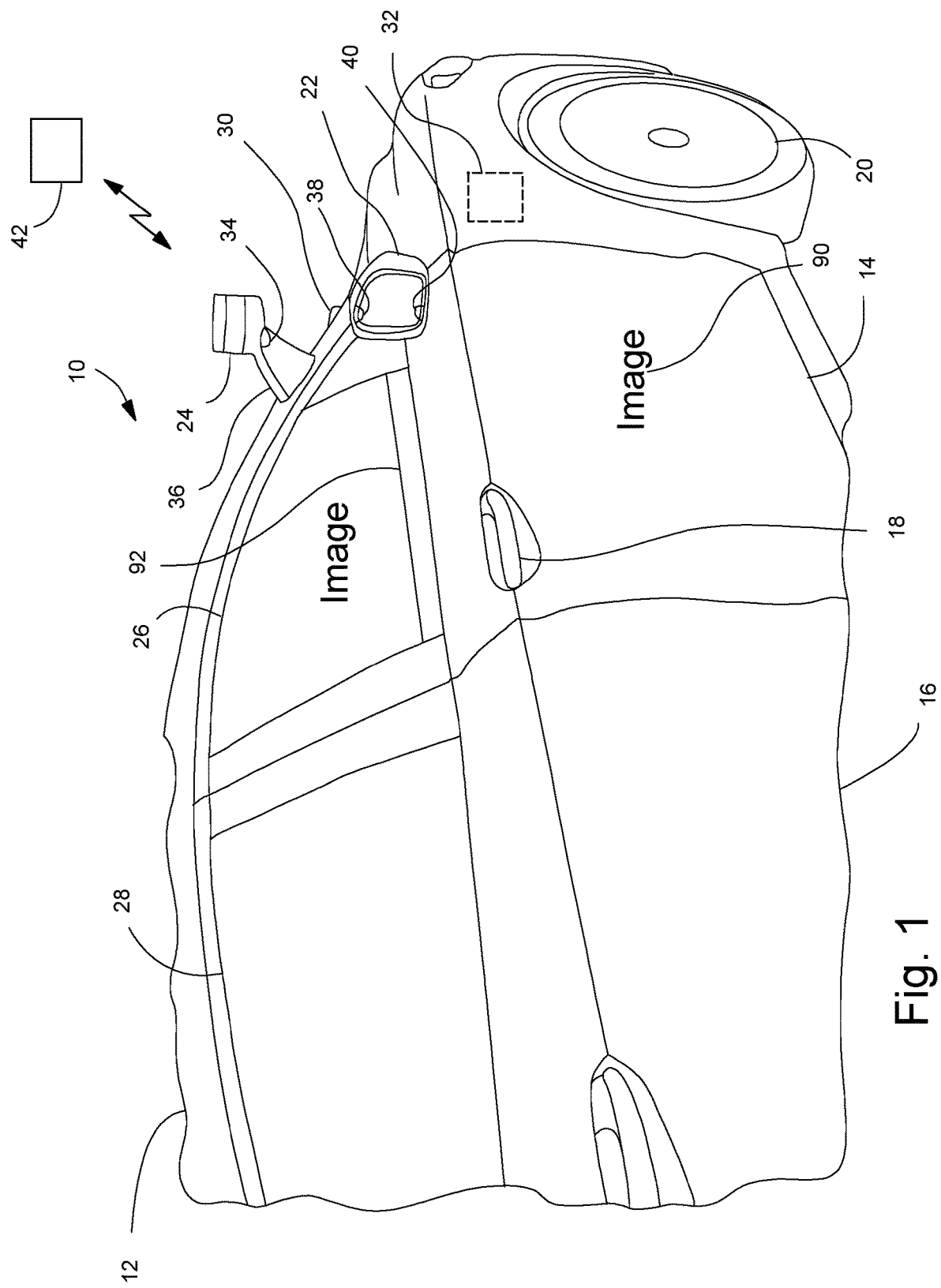

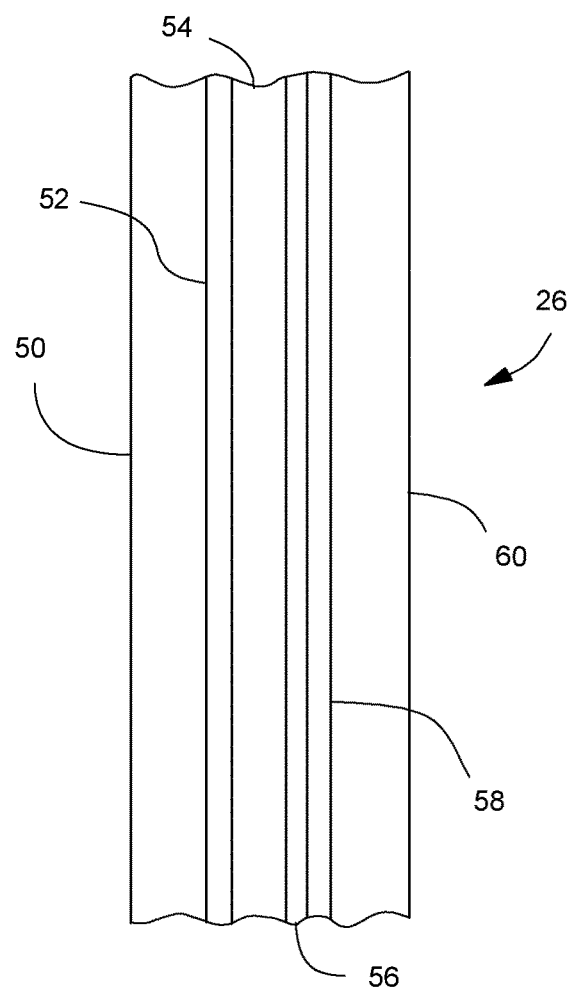
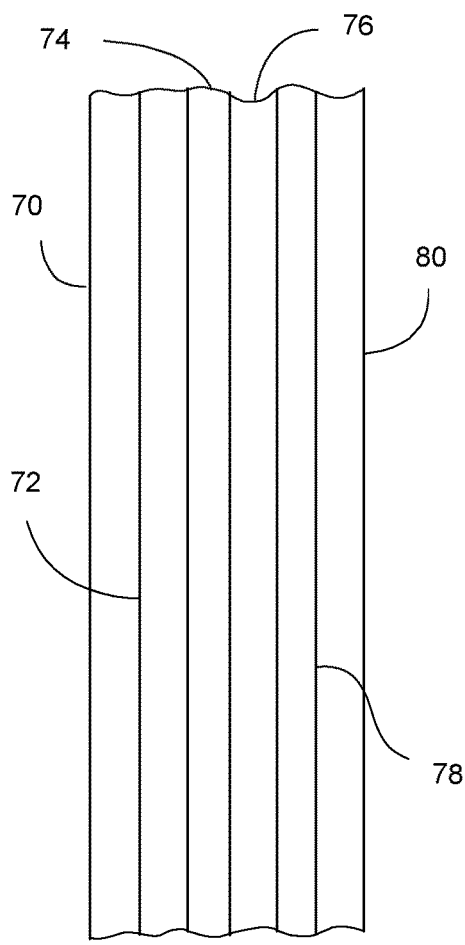

US 10,549,683 B1

VEHICLE EXTERIOR ILLUMINATION

BACKGROUND OF THE INVENTION

The present invention relates to exterior illumination of a vehicle and more particularly to using an ultraviolet (UV) laser to illuminate exterior portions of a vehicle.

With different usages of vehicles, such as rental, ride-sharing, autonomous and delivery vehicles, it may be advantageous to selectively provide information visible to people outside of the vehicle without interfering with the ability of people in the vehicle to see outside without obstruction of the view. It is also desirable for this information to be visible, even when displayed in bright sunlight. Additionally, it is desirable for any lettering or symbols to be easily and quickly changeable.

SUMMARY OF THE INVENTION

An embodiment contemplates a vehicle having a window including an outer layer, perovskite adjacent to and inboard from the outer layer, and a UV blocking layer inboard from the perovskite; and a UV laser mounted on a vehicle exterior and directed toward the window.

An embodiment contemplates a vehicle comprising having an exterior body panel having an outer layer of clearcoat, an adjacent layer of perovskite inboard from the clearcoat and a layer of basecoat inboard from and adjacent to the perovskite; and a UV laser mounted on a vehicle exterior and directed toward the exterior body panel.

An advantage of an embodiment is that information can be provided to people exterior to the vehicle, even in broad daylight, without interfering with viewing from within the vehicle. Moreover, ultraviolet (UV) light that is used to create the image on the vehicle is blocked from being received by people within the vehicle. Additionally, a side illuminated stripe (or other symbol) on the vehicle exterior may be illuminated by the UV light to allow others to more easily see the vehicle when parked, or provide general lighting exterior to the vehicle.

BRIEF DESCRIPTION OF THE DRAWINGS

FIG. 1 is a schematic perspective view of a portion of a vehicle with exterior illumination.

FIG. 2 is a schematic side view of a portion of a vehicle window.

FIG. 3 is a schematic side view of a portion of a vehicle outer door panel.

DETAILED DESCRIPTION

FIG. 1 illustrates a vehicle 10 having a body 12, including front 14 and rear 16 doors with door handles 18, wheels 20 a side view mirror 22 and optionally a vehicle mounted light detection and ranging (LIDAR) sensor 24 (or other similar type of sensor, such as RADAR) if the vehicle 10 is autonomous or semi-autonomous. The front and rear doors 14, 16 may include front and rear windows 26, 28, respectively. The body 12, including the doors 14, 16 may be painted.

A light sensor 30 may be mounted on/in the vehicle 10 to detect light (i.e., day/night) conditions around the vehicle 10. This sensor 30 may be in communication with a vehicle controller 32. The controller 32 may be a separate controller or may be integrated into another of the vehicle's controllers such as for example a body controller, if so desired. The controller 32 may also be in communication, either directly or indirectly, with a wireless device 42, such as for example a cell phone.

An ultraviolet (UV) laser 34 may be mounted, for example, on the housing 36 for the LIDAR sensor 24 and oriented to direct the UV light onto the front window 26. This UV laser 34 may be in communication with the controller 32. A UV laser 38 may be mounted, for example, on or in the side mirror 22 and oriented to direct UV light onto the front window 26. This UV laser 38 may also be in communication with the controller 32. A UV laser 40 may be mounted, for example, on or in the side mirror 22 and oriented to direct UV light onto the front door 14. This UV laser 40 may also be in communication with the controller 32. While this example of the vehicle 10 is illustrated with three UV lasers 34, 38, 40, the vehicle may have only one or two of these lasers, which may be directed only onto the front window 26, only onto the front door 14 or on both, as desired. Alternatively, the UV lasers may be mounted on other body structure in order to provide exterior illumination for rear windows, rear doors or other structure, rather than the examples shown herein illuminating the front windows and front doors. UV lasers in and of themselves are known in the art and so will not be discussed in more detail herein.

As for the side mirror mounted UV lasers 38, 40, one or the other or both may be mounted behind the mirror 22 and project UV light through a hole in the mirror surface itself or a hole in the metallization of the mirror surface itself, or may be mounted above, below or off to the side of the mirror 22, as desired for packaging and esthetic purposes.

In order for the UV lasers 34, 38, 40 to produce visible light for people to see, the front window 26 and/or the front door 14 (or other body structure), as the case may be, include layers of material that will radiate the visible light when excited by the UV lasers.

FIG. 2 illustrates layers of material that may form, for example, the front window 26. The outermost layer 50 may be glass or similar relatively hard, translucent material. The layer adjacent to this may be a perovskite layer 52, which may be a material having a similar type of crystal structure as calcium titanium oxide mineral ($CaTiO_3$). The concentration of the perovskite in this layer 52 may be provided such that the window 26 does not glow with visible light noticeably from mere sunlight illuminating the window but upon application of one of the UV lasers 34, 38, the visible light image produced is noticeable by people outside of the vehicle 10, even in bright sunlight.

Three types of perovskite phosphorescent nano-materials may be employed in the layer 52. As non-limiting examples, to produce red visible light in the 750 nanometer (nm) wavelength range, the UV laser may emit 380 nm light, to product green visible light in the 540 nm wavelength range, the UV laser may emit 360 nm light, and to produce blue visible light in the 450 nm wavelength range, the UV laser may emit 340 light—this allows for single color or red-green-blue (RGB) color images. The three types of perovskite crystals may be compounded (in for example PVB, discussed below) and extruded into a clear sheet or painted or sprayed onto a sheet.

A Polyvinyl butyral (PVB) layer 54 is adjacent to the perovskite layer 52. Inboard and adjacent to the PVB layer 54 is a partial vacuum metalized film layer 56. While this layer 56 may be optional, the layer 56 may reflect, for example, about eighty to ninety five percent of UV light from passing through the window 26. This reflection may increase efficiency of the UV laser by reflecting UV light back into the perovskite layer 52, causing additional emission of visible light. This reflection may also help to assure that most of the visible light emitted from the perovskite layer 52 is reflected outward from the vehicle 10 instead of within the vehicle—this may minimize any visible light glow seen by occupants within the vehicle 10.

Adjacent to and inboard of the metalized film layer 56 (or PVB layer 54, if layer 56 is not employed) is a UV light blocking layer 58. The UV blocking layer 58 blocks any UV light emitted outside of the vehicle 10 from passing through the window 26 into the vehicle interior—this includes both UV light from sunlight and the UV light emitted by one or more of the UV lasers 34, 38. The UV blocking layer 58, for example, may include a benzotriazole or benzaphone class of UV inhibitor that is tuned to block light with wavelengths less than about 400 nm. This UV blocking layer 58 may be optional if UV blocker is incorporated into the PVB layer 54, as desired. The inboard-most layer 60 may be glass or similar relatively hard, translucent material.

FIG. 3 illustrates layers of material that may form the outer body panel of, for example, the front door 14. The innermost (inboard) layer 70 may be the substrate material, such as for example steel or aluminum. An electro-coat layer 72 is adjacent to the substrate 70, providing typical corrosion protection. A primer layer 74 is applied over layer 72 and may include one or more coats of primer, as is typically applied to a vehicle. Vehicle primer typically provides UV resistance. A basecoat layer 76 is applied over layer 74 and may include one or more coats of paint, as is typically applied to a vehicle. A layer of perovskite 78 is adjacent to and outboard of the basecoat 76, in the areas of the door 14 where one wishes to provide the UV laser produced images. The outermost (outboard) layer 80 is clearcoat, which as typically applied can withstand UV light.

The operation of exterior vehicle illumination will now be discussed relative to FIGS. 1-3. The operation may be controlled by the controller 32, in communication with other sensors and instructions received from other sources, such as wireless devices 42.

If the vehicle 10 is being employed as an autonomous ride-share or delivery vehicle, the laser(s) 34, 38, 40 may be activated to create one or more visible images 90 on the front window 26 or front door 14 to provide a ride code or other instructions visible to a person outside of the vehicle. 10. For vehicle use as a rental car, the visible image 90 on the window 26 and/or door 14 may be a car number, assisting one in finding a parked rental car.

Since the vehicle 10 may be used in various weather and day/night conditions, the light sensor 30 may be employed to change the intensity of the UV laser light, thus changing the intensity of the visible light emitted. This allows for a brighter visible light image 90 in bright sunlight while reducing the brightness for nighttime viewing.

The exterior illumination may take the form of a side illumination stripe 92 along a bottom of the front window 26, which may be illuminated during rider pick-up/drop-off situations. This stripe 92 may also be illuminated when the vehicle 10 is stopped, making the vehicle 10 more noticeable to those around it. The intensity of the visible light emanating from the stripe 92 may be based on the ambient light detected by the light sensor 30.

The exterior illumination may be based on the vehicle 10 being placed in a camper mode, which illuminates the window 26 and/or door 14 to produce a night-light effect. Or, one may have an option to put personal messages on the door 14 or window 26, entered either through a wireless device 42 or through a touch screen in the instrument panel within the vehicle. An additional use may be automatic messages created based on vehicle conditions, such as for example, low fuel, for rent, etc.

While certain embodiments of the present invention have been described in detail, those familiar with the art to which this invention relates will recognize various alternative designs and embodiments for practicing the invention as defined by the following claims.

The invention claimed is:

1. A vehicle comprising:
   a window including an outer layer, perovskite adjacent to and inboard from the outer layer, and a UV blocking layer inboard from the perovskite; and
   a UV laser mounted on a vehicle exterior and directed toward the window.

2. The vehicle of claim 1 wherein the window further includes a partial vacuum metalized film layer between the perovskite and the UV blocking layer.

3. The vehicle of claim 2 wherein the window further includes a Polyvinyl butyral layer between the perovskite and the partial vacuum metalized film layer.

4. The vehicle of claim 1 wherein the window further includes a Polyvinyl butyral layer between the perovskite and the UV blocking layer.

5. The vehicle of claim 4 wherein the window further includes a glass layer adjacent to and inboard from the UV blocking layer.

6. The vehicle of claim 1 wherein the window further includes a glass layer adjacent to and inboard from the UV blocking layer.

7. The vehicle of claim 1 wherein the outer layer is glass.

8. The vehicle of claim 1 further including a controller configured to activate the UV laser to produce an image visible from exterior to the vehicle on the window.

9. The vehicle of claim 1 further including:
   an exterior body panel having an outer layer of clearcoat, an adjacent layer of perovskite inboard from the clearcoat and a basecoat layer inboard from and adjacent to the perovskite; and
   a second UV laser mounted on the vehicle exterior and directed toward the exterior body panel.

10. The vehicle of claim 1 wherein the UV laser is mounted on a side mirror.

11. The vehicle of claim 1 wherein the UV laser is mounted on a LIDAR sensor housing.

12. A vehicle comprising:
    an exterior body panel having an outer layer of clearcoat, an adjacent layer of perovskite inboard from the clearcoat and a basecoat layer inboard from and adjacent to the perovskite; and
    a UV laser mounted on a vehicle exterior and directed toward the exterior body panel.

13. The vehicle of claim 12 wherein the exterior body panel further includes a primer layer inboard from and adjacent to the basecoat layer.

14. The vehicle of claim 13 wherein the exterior body panel further includes an electro-coat layer inboard from and adjacent to the primer layer.

15. The vehicle of claim 14 wherein the exterior body panel further includes a metal substrate inboard from and adjacent to the electro-coat layer.

16. The vehicle of claim 12 wherein the exterior body panel further includes a metal substrate inboard from the basecoat layer.

17. The vehicle of claim 12 further including a controller configured to activate the UV laser to produce an image visible from exterior to the vehicle on the body panel.

18. The vehicle of claim 12 wherein the exterior body panel is a front door.

19. The vehicle of claim 12 wherein the UV laser is mounted on a side mirror.

\* \* \* \* \*